Nov. 24, 1964 J. D. SKELTON 3,158,832
CYCLE BREADTH TRANSCRIBER EMPLOYING A SAWTOOTH GENERATOR
Filed Oct. 28, 1959 4 Sheets-Sheet 1

Jesse D. Skelton   Inventor

By *John D. Gassett*   Attorney

Nov. 24, 1964  J. D. SKELTON  3,158,832
CYCLE BREADTH TRANSCRIBER EMPLOYING A SAWTOOTH GENERATOR
Filed Oct. 28, 1959  4 Sheets-Sheet 4
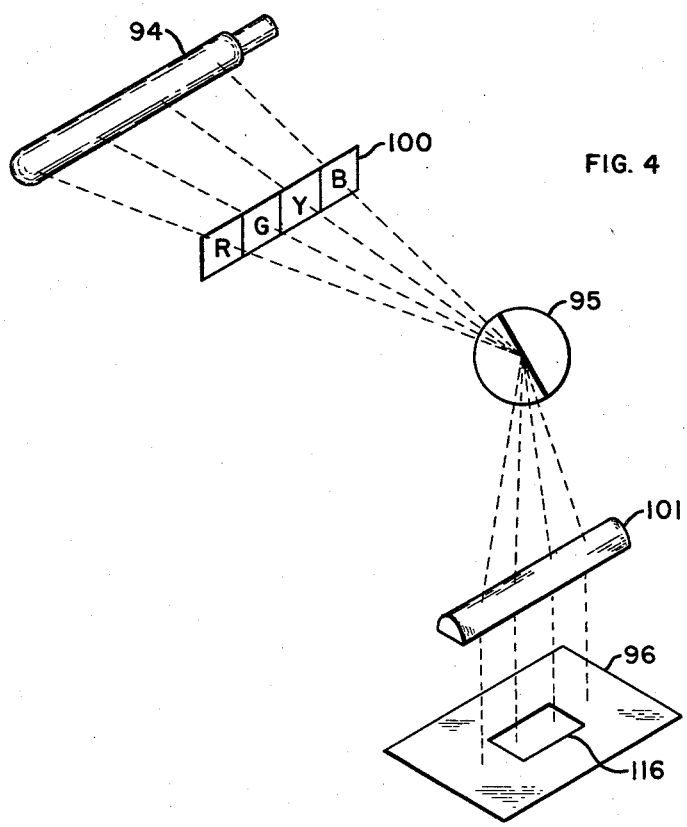
FIG. 4
FIG. 5
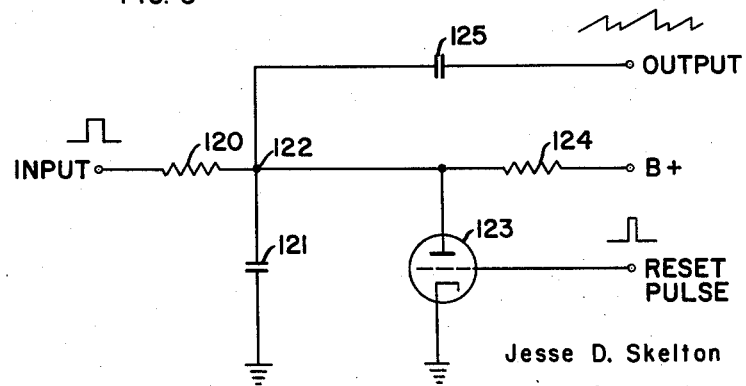
Jesse D. Skelton  Inventor
By John D. Gassett  Attorney

United States Patent Office 3,158,832
Patented Nov. 24, 1964

3,158,832
CYCLE BREADTH TRANSCRIBER EMPLOYING A SAWTOOTH GENERATOR
Jesse D. Skelton, Tulsa, Okla., assignor to Jersey Production Research Company, a corporation of Delaware
Filed Oct. 28, 1959, Ser. No. 849,321
23 Claims. (Cl. 340—15.5)

This invention broadly concerns an improved seismic method and apparatus for use in geophysical prospecting. It especially concerns an apparatus and process for translating oscillographic-type seismic sections into variable area and density or color traces which are individually corrected for seismic errors and which are representative of the frequency of the oscillographic type seismic section thus transcribed.

Geophysical prospecting using artificially induced seismic disturbances has found wide application in the search for petroleum and other products. It is the general practice to initiate an explosion or other seismic disturbance at a point near the surface of the earth to direct seismic waves downward into the earth from that point. The waves continue to travel downward within the earth until they encounter discontinuities in the earth structure in the form of various substrata formations or the like. These discontinuities have the effect of reflecting at least a portion of the seismic waves back toward the surface of the earth. By arranging a plurality of geophones or other seismic transducers in spaced distances from the seismic disturbance point, it is possible to detect the arrival of the reflected seismic waves at the surface of the earth. These detected waves are translated to electrical impulses which are then indicative of the character of the ground motion and are usually referred to collectively as a seismic signal which is in effect a composite signal made up of a plurality of electrical signals varying in frequency and amplitude. The electrical signals oscillate by a no signal, zero voltage, quiescent point or a record reference base line.

Generally speaking the seismic signal generated by each detector or a group of detectors in a seismic observation is recorded in the form of a separate trace on a seismogram. In other words, each trace on a seismogram is a record with time of the variations in the output of the detector associated with the trace.

Until recently, most seismic information has been generally recorded using either the reflecting mirror galvanometers or oscillographic pen recorders. Thus the train of signals generated by each geophone or seismic transducer is translated to a galvanometer or pen recorder and a suitable record medium such as a photographic film or record paper moved relative to the recording device. A record in the form of an oscillographic or "wiggly" trace is thereby recorded on a record medium. The amplitude and frequency of the trace is directly related to the magnitude and frequency of the signal which is transmitted by the seismic transducer to the recording device.

The usual practice has been to examine the amplitude characteristics of the recordings made of the seismic signals by correlating the amplitudes of a plurality of traces on a seismic record. Seismic observers can, by observing such traces, determine the shape of reflecting subsurface formations. By accurately recording the time required for the seismic waves to travel to the reflection surfaces and return to the geophones, it is possible to determine the depths to such reflection surfaces.

Most conventional seismographs—that is devices for recording seismic signals—are capable of recording up to 24 or more separate seismic signals simultaneously. Thus, if a seismic observation results in 24 seismic signals being generated at as many detection stations, the resulting seismogram is a 24 trace record of the resulting 24 signals. The traces are usually arranged in a side-by-side relationship. A timing trace, indicating predetermined time intervals, is simultaneously recorded with the seismic signals to indicate the lapsed time after the shot to any point on each trace. Once a seismogram has been made, persons skilled in the art are generally able to determine from the seismogram certain characteristics of the earth's substrata in the vicinity of a seismic observation.

The accuracy of exploration by seismic methods depends to a large extent upon the ability of an observer to analyze recorders of seismic information. It has been found that variable density records, in which the signal is reproduced as a photographic trace for example in which the density along the trace is varied in proportion to the intensity of the signal, are more easily analyzed than other types of records. A considerable number of seismic sections have been prepared in the past in the oscillographic type sections. A system for transcribing such oscillographic-type sections into variable density sections is described in the patent application Serial No. 771,668 filed in the names of John Martin Horeth, Jesse Daniel Skelton, and William Joseph Stark now Patent 3,119,878. That system of converting oscillographic-type traces or seismic sections into variable density sections has proved quite helpful to seismic observers. However such methods of recording variable density in seismic information in variable density form do not readily reflect changes in the frequency of the recorded seismic signal. This shortcoming has developed into a disadvantage inasmuch as it has now been observed that changes in record frequency—that is, frequency of the seismic signal—are related to subsurface conditions which may have a bearing on petroleum or other mineral exploration. It is accordingly one of the objects of this invention to provide a system for translating or transcribing oscillographic traces or graphs into traces or sections which readily reflect frequency changes of such translated graphs or traces.

Preferably, this invention includes a system for translating seismic data from oscillographic-type section into a section form in a manner which emphasizes frequency variations in a way which utilizes (a) normal shades of gray between white and black or (b) selective variations in color. Each half-cycle is preferably used to control both the shade of gray recorded and the area of gray recorded for that particular half-cycle. If it is preferred to present the frequency variations in color form, each half-cycle is used to control the color recorded and the area of color thus recorded for that particular half-cycle. In other words, in a preferred embodiment the distance between zero crossings are used to determine (1) the area to be exposed on a photosensitive medium, and (2) the intensity or color of the exposure.

At this point it is well to note that several terms in this description are assumed to have the following meaning. Thus the term "frequency" is meant to be the number of times a signal wave form or seismic signal crosses the zero signal axis per unit of time. The term "zero crossing" refers to the crossing of a zero axis by the signal wave form. The term "half-cycle breadth" refers to the distance between two successive zero crossings.

Other objects and a better understanding of this invention may be had by referring to the following description and claims taken in conjunction with the accompanying drawings in which:

FIG. 4 illustrates schematically components of printing mechanism of FIG. 2; and FIG. 5 illustrates an electrical circuit of a suitable pulse stacker used in the invention.

Figure 1:
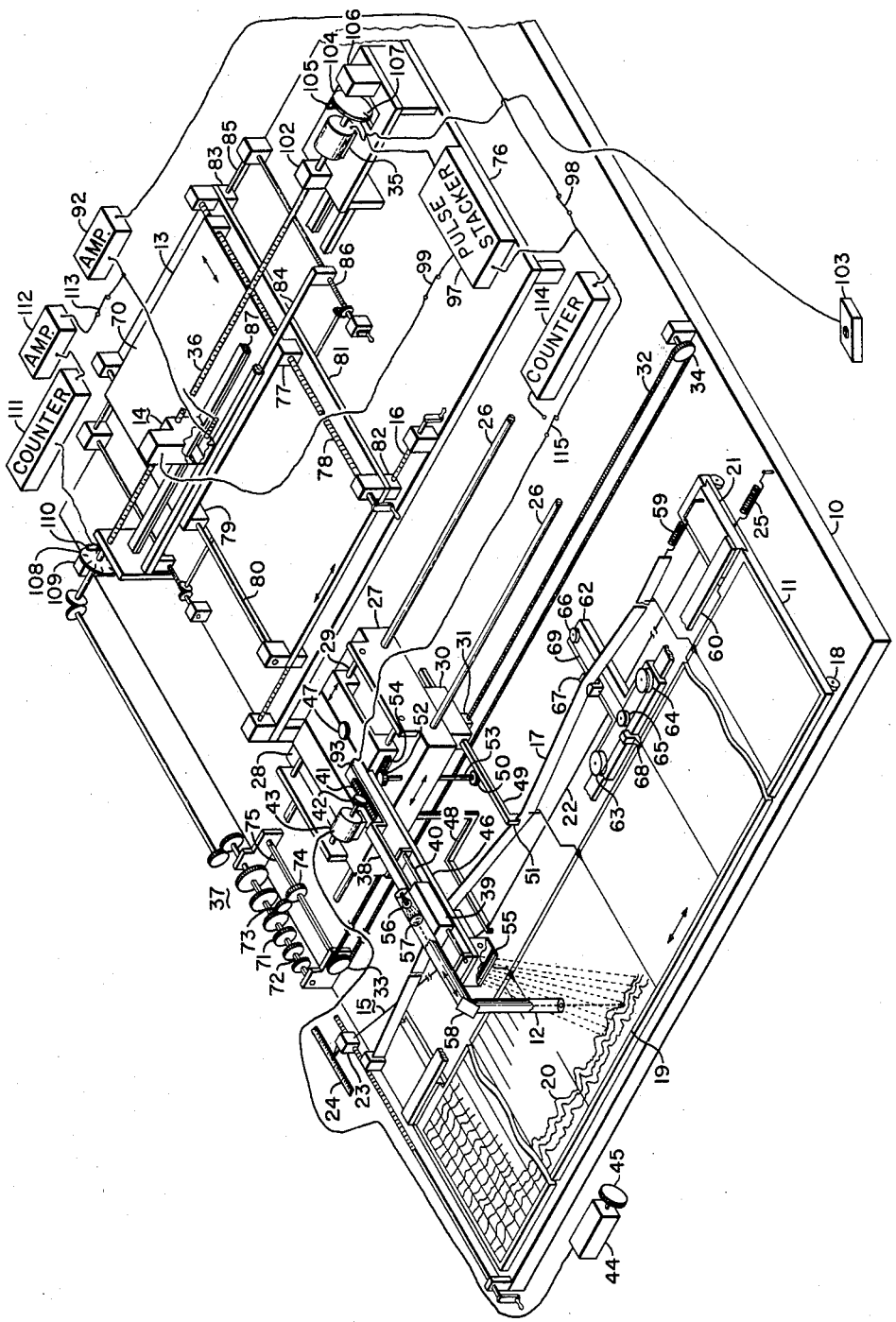
FIG. 1 illustrates a preferred apparatus embodiment of the invention in perspective, schematic form.

Referring first to FIG. 1, which illustrates a preferred embodiment of the invention and the best mode contemplated for carrying out the invention, it will be seen that the apparatus includes means for translating or transcribing a wiggly trace section into a variable density or color and variable area seismic section reflecting changes in seismic frequency. It will also be seen that the apparatus is capable of incorporating corrections into the transcribed seismic section including (1) static corrections to compensate for various elevations to the geophones, (2) spread correction factor to compensate for the distances the geophones are located from the shock point and (3) paper speed variations to correct the error in the relative length of portions of the paper or papers on which the oscillographic trace was recorded.

Referring to FIG. 1 it will be seen that the invention, in an apparatus form, includes a base member 10, an original record holder or mounting 11, stylus 12, section holder 13, recording head 14, spread correction mechanism 15, static correction lead screw 16 and paper speed variation mechanism 17.

The record holder 11 is arranged to be longitudinally movable relative to base member 10 as by means of suitable supporting rollers 18. The record holder additionally is adapted to hold a conventional seismic record 19 on which are recorded oscillographic-type traces produced by a reflecting mirror galvanometer or the like. It will be recognized that longitudinal distances and measurements along the length of the seismic record (in the record holder 11) corespond to time measurements on the record itself. Furthermore, the lateral distances or displacements on the seismic record correspond to variations in the amplitude of the seismic signals that are recorded on the record. In the figure, a trace 20 which is typical and representative of the traces that are obtained on conventional seismic records, has been depicted upon record 19.

Further relative to the record 19, it will be noted that this record is placed on record holder 11 in a manner such that the shallow end of the record i.e., the portion of the record corresponding to the reflections from shallow portions of the earth is disposed toward the left end of the record holder in the figure. By locating the shallow end of the record in this maner, the record is properly coordinated with the spread correction device 15 which will become more apparent later in this description.

An arm 21 is secured to one end of the record holder 11 as shown in the figure. It is preferred that this arm be connected to the end of the record holder which corresponds to the deep end of the record 19 in order to render the apparatus more compact in its construction.

Secured to the arm 21 is an elongated flexible member 22 which extends from the arm to a laterally adjustable anchoring member 23. The latter member may be conveniently mounted to base member 10; but it must be free to move laterally with respect to the longitudinal axis of the record holder 11, that is, the longitudinal effective center line of each trace 20. Suitable mounting means for this purpose have not been illustrated in FIG. 1 in order to avoid complicating the figure unduly; furthermore, the nature of such mounting means will be readily apparent to persons skilled in the art.

A suitable scale 24 is provided adjacent anchoring member 23 so that the degree of lateral displacement of member 23 relative to the longitudinal axis of record holder 11 and trace 20 may be readily determined. Scale member 24 is also arranged transversely with respect to the longitudinal axis of record holder 11 and it is provided with a scale such that distances along the scale are proportional and related to the distances between the shot point location and the seismic transducer location producing the trace on the record 19. This scale may be calibrated in terms of feet or time, but it must be consistent with the time scale which is employed on the record itself. Thus, it will become more apparent in the following description, scale 24, record member 23, and elongated member 22 cooperate with one another to automatically correct each trace 20 on the record 19 for spread errors as these traces are translated to a corrected section holder 13.

Holder 11 is normally urged toward the right hand side of the overall apparatus in the figure as by means of a spring 25. Elongated member 22 in combination with anchor member 23 prevents holder 11 from moving too far in the direction of spring 25. Additionally spring 25 keeps member 22 in a continuous state of tension. It will be apparent of course that other means such as weights or the like may also be adapted to serve this function.

Having described the main elements of record holder 11, attention is now directed to the scanning mechanism which includes stylus 12, longitudinal rods 26, lower body member 27, upper carriage 28 slidably supported from carriage 27 by bars 29, and undercarriage 30 rigidly supported from carriage 27 and in turn supporting driving member 31 which is secured to and propelled by endless belt 32. In other words, member 31 travels along endless belt 32 and engages and drives lower body member 27 each time that it moves from pulley 33 to pulley 34. These pulleys and endless belt 32 are actuated and driven as by means of by variable speed motor 35. lead screw 36, and speed changer means 37.

Transverse motion of stylus 12 relative to record 19 may be coordinated with lateral movement or lateral variations of the trace being transcribed in a variety of ways. One particular suitable means for obtaining this objective includes selsyns 41 and 44 and control knob 45. Stylus arm 38 is supported by transverse carriage 39 which in turn is supported on transverse carriage bars 40. Rack 41 is mounted on carriage 39 and pinion gear 42 meshes with rack 41. Gear 42 is driven by selsyn 43 which is mounted on carriage 28.

Stylus arm 38 is supported by transverse carriage 39 which in turn is slidably supported on transverse carriage arms 40. Thus rotational moving of pinion gear 42 together with rack 41 cause carriage 39 and arm 38 to move laterally relative to the movement of carriage member 27 along bars 26. Transverse bars 40 are supported from arm 46 which is slidably mounted on upper carriage 28 and which can be locked into position by means of locking screw 47. Arm 48 is rigidly connected to carriage member 27 and its outer extremity rides along flexible member 22. Member 22 form a part of the spread correction mechanism 15.

Linear light source 55 at the outer end of arm 46 directs a faint beam of light on seismogram 19 coincident with a point of light projected by stylus 12. Adjustment of arm 46 which aligns the beam from source 55 with the zero axis of traces on seismogram 19 can help the operator to follow them. Light source 56 in stylus 12 directs the beam of light focussed by lens 57 and reflected it by mirror 58 on a spot down to the seismogram.

Rack 49 engages lower pinion 50 and is slidably mounted within undercarriage 30. Cam folower 51 at the end of rack 49 is adapted to ride along the linear cam or tape 17. Tape 17 is provided to compensate for time errors occasioned by variations in the speed of the recording process used to obtain the original record. Lower pinion 50 drives upper pinion 52 through shaft 53. Upper pinion 52 engages rack 54 on upper carriage 28.

Linear cam or tape 17 extends the length of seismogram 19. It is mounted rigidly at one end to bar 60 and at the other end to spring 59. Spring 59 is secured to arm 21. A mechanism of the drawing operable with the scanning mechanism can compensate for any time-line spacing variations along the record 19 includes a plurality of pulley assemblies 62 mounted on and spaced along calibrated reference bar 60 which is mounted on record holder 11. Assembly 62 includes two pulleys 63 and 64, translating pulley 65, lateral pulley 66, clamp 67, index member 68 and wire 69. Movements of index member 68 along the seismogram 19 cause clamp 67 to move equal distances in a transverse direction. Record holder 11 has a reference mark for aligning the "break-time" of successive seismograms. Since the "break-time" of any given seismograms may not coincide exactly with the "time-line" it is desirable that bar 60 be adjustable slightly along record holder 11. Then, the zero time mark on the bar can be aligned with the convenient time line, preferably a line adjacent the "break-time." This line, although not the actual zero time for the seismogram, is commonly called "the zero time line."

In operating the apparatus shown, a number of pulley assemblies equal the number of major time divisions along seismogram 19 are conveniently employed. Thus if a 5 second record is to be examined 5 pulley assemblies may be used, one for each second of record time. The "zero time" line on a seismogram is a line with the zero mark on the bar 60; and if no variations exist in the spacings in the line of the seismogram, they should correspond or line up with the time lines on the bar. Then when the index members of the pulley assemblies are positioned opposite certain time lines on the calibrated bar, they will also be opposite corresponding lines on the seismogram. However if any of the time lines on a seismogram are distorted and do not properly line up with the lines on the bar, the index members of the pulleys are adjusted in a line with the time lines on the seismogram. This causes their respective clamps to be transversely displaced corresponding distances from the base line of the linear cam 17.

If no timing distortions exist in the seismogram 19, the base line of cam 17 is parallel to the time axis of the traces on the seismogram. Otherwise it has departures along its length so that the cam followers 51 and arm 49 move laterally in and out thereby causing upper carriage 28 to move back and forth parallel to the time axis of the seismogram. Upon consideration, then, it will be apparent that the stylus 12 is made to advance relatively faster or slower than the recording means 14 along the recording medium 70, depending upon the existence of any timing errors in seismogram 19. In other words, the cam 17 together with this cam follower and associated parts enable stylus 12 and the recording means 14 to travel along the length of their respective records in substantially time synchronism.

Referring for the moment to the recording medium 70 it will be apparent that it is desirable to print all seismic sections so as to possess the same time distance relationships. In other words, it is desirable that a given linear length along each section correspond to the same amount of recording time and seconds. Upon reflection, this could cause a serious problem with regard to conventional oscillographic seismic records, since the physical lengths of such records for equal lengths of recording time vary substantially. To overcome this difficulty a speed changer 37 is provided. This changer employs a plurality of driver gears 71 mounted on drive shaft 72, a movable idler gear 73, a movable driven gear 74, and a drive shaft 75. Thus depending upon the selection of the driver gear 71, the driven gear 74 and a shaft 75 are made to turn at different speeds. As a result, the speed of belt 32 is variable and may be made to correspond to the speed of the printing mechanism blank along the recording medium 70. It will be recognized of course that a continuously variable speed transmission may be readily used in place of the transmission shown.

The entire printing portion of the apparatus may be mounted directly upon base plate 10. In the figure it is shown to be located on a platform 76. Film holder 13 is supported on nuts 77 which engage trace positioning lead screw 78, and on bearing blocks 79 which slidably engage rod 80. Platform 81 similarly is supported by nuts 82 and bearing blocks 83 which movably engage static correction lead screw 16 and rod 85 respectively. A slit width adjusting bar 84 supporting one of the transverse support bars 87 and extending the length of the film is transversely adjustable upon movement of lead screw 86. Thus, the width of the beam of light projected from the printing head 14 can be readily adjusted. It will be appreciated that the entire printing portions of the apparatus shown are preferably positioned within a light tight enclosure.

Longitudinal movement of printing mechanism 14 and the stylus 12 is effected by movement of lead screw 36 in response to reversible and variable speed motor 35 through gear box 102. Motor 35 may conveniently be a D.C. motor actuated by foot operated motor control switch 103. Thus, the operator of the apparatus shown can readily control the rate of travel of stylus 12 and the printing head 14 along the respective records. In the apparatus illustrated there is shown a satisfactory means of permitting the rate of travel to vary. A slotted disc 104 having a slot 107 is mounted upon a shaft from motor 35. On one side of disc 104 is photocell 105 and on the other side is light source 106. It will then be apparent that disc 104 upon being rotated by motor 35, causes an electrical pulse to be generated by photocell 105 each time the slot 107 passes between the photocell and light source 106. The pulses from photocell 105 are fed to pulse stacker 97. For each unit of movement of stylus 12 along the longitudinal dimension of this oscillographic trace being transcribed and the movement of the printing head blank along record 70 there is an equal number of pulses generated from photocell 105 irrespective of the rate or speed of the scanning. In other words, the number of pulses generated is proportional to the distance scanned or printed.

Mounted on upper carriage 28 is pulse switch 93. Pulse switch 93 is arranged such that it is actuated by the movement of arm 46 each time the stylus 12 crosses the zero axis, or a reference voltage line, of the trace that is being processed. Pulse switch 93 can comprise a conventional microswitch. Pulse switch 93 is electrically connected to pulse stacker 97. The pulses from photocell 105 are also fed to pulse stacker 97. The output from pulse stacker 97 is electrically connected to galvanometer 95 within printing means 14.

Pulse switch 93 is also electrically connected to amplifier 92. The output of amplifier 92 is electrically connected to solenoid 91 of the printing mechanism 14. Switch 98 is conveniently placed in the line between pulse switch 93 and amplifier 92. Switch 99 is conveniently placed between pulse stacker 97 and galvanometer 95. It will be seen these switches are used when it is desired to print a time line on the data.

A suitable circuit for pulse stacker 97 is illustrated in FIG. 5. It comprises a modified RC circuit having a resistance 120 and a capacitor 121 with junction 122 therebetween. The pulses from photocell 105 are fed to the indicated input. An electronic triode 123 is connected thorugh its plate to junction 122. The grid of triode 123 is connected to pulse switch means 93 and discharges capacitor 121 upon receiving a pulse from pulse switch means 93. A B+ voltage source is fed to the circuit through resistance 124. An output voltage is taken through output capacitor 125. For a better understanding of the operation of the pulse stacker attention is directed to FIG. 3 in which curve A illustrates a seismic trace. Curve B illustrates zero crossing pulses generated when stylus 12 crosses the zero axis of the trace (represented here by curve A) being scanned; the pulses being actuated by pulse switch 93. Curve C represents pulses which are fed from photocell 105 to the pulse stacker. It will be noted that in curve C there is an equal number of pulses per unit distance. Curve D illustrates the stacking of the pulses received from curve C. Due to the summing action of the condenser 121 and resistor 120, each pulse of curve C increases the voltage level by an equal amount in curve D. When a zero crossing pulse, as illustrated in curve B, is received by the pulse stacker, the pulse stacker is reset to zero, and again starts "stacking" the pulses illustrated in curve C. The output of curve D is electrically connected to galvanometer 95 of printing mechanism 14.

Figure 2:
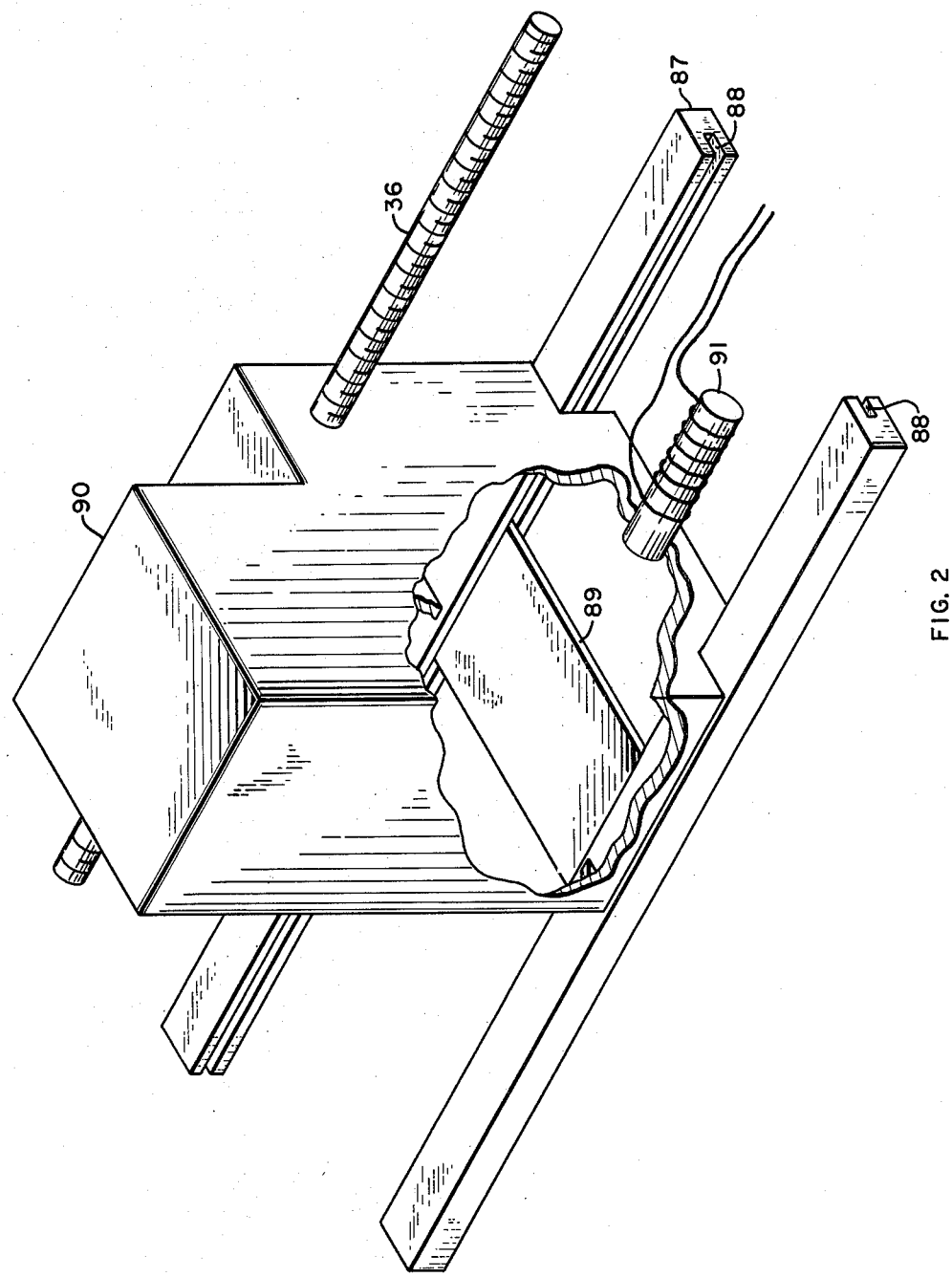
FIG. 2 illustrates an enlarged cutaway view of the printing mechanism shown in FIG. 1.
Figure 3:
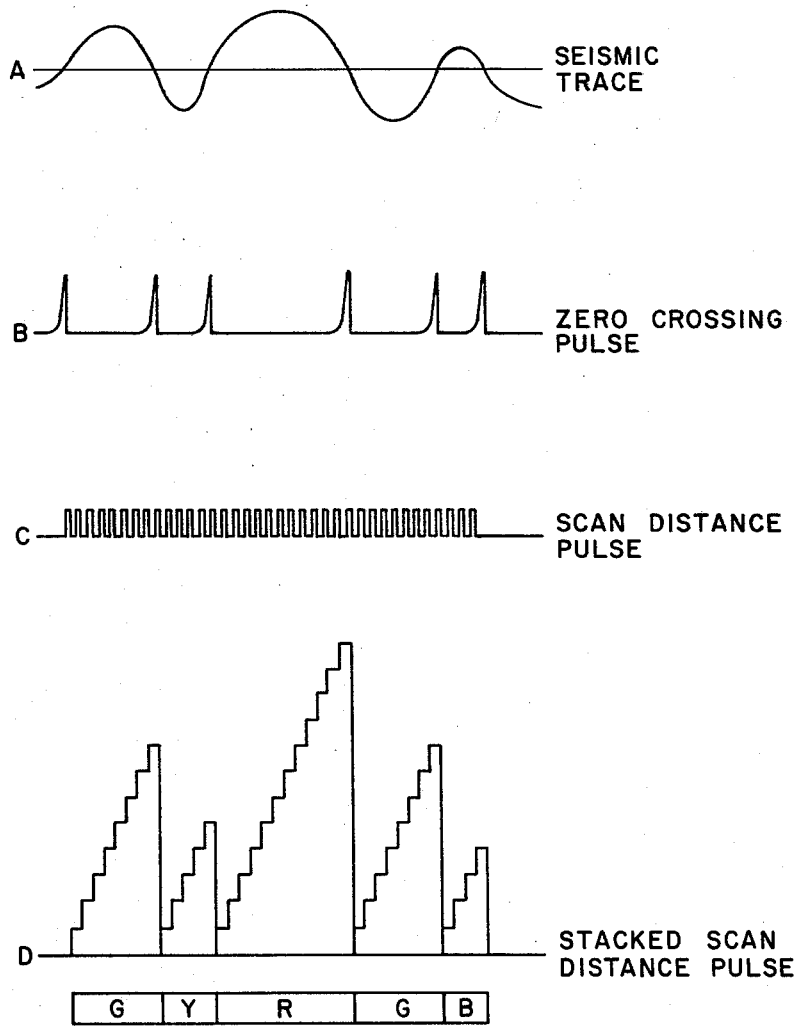
FIG. 3 illustrates wave forms at various stages in the system.

Attention will now be directed especially towards FIGS. 2 and 4 for more detailed description of the printing mechanism 14. Transverse support bars 87 have internal slots 88 in which is supported a permeable shutter 89. Also mounted on bars 87 is printing housing 90. Lead screw 36 driven from motor 35 drives the printing house 90 along bars 87. Supported within housing 90 is solenoid 91. Solenoid 91 is electrically connected to amplifier 92 which amplifies the pulse received from pulse switch 93. Permeable shutter 89 is slidably moveable within horizontal slots 88. Mounted within printing housing 90 are area light source 94, color wedge or filter 100, a reflecting galvanometer 95, lens 101 and light aperture 116 in shield means 96. It will be recognized that the width of light aperture 116 will be wider or as wide as any slit width adjustment that will be made and the other dimension of the area of light aperture 116 will be as great or greater than that required to represent the greatest distance between zero crossings of the traces to be transcribed. Galvanometer 95 is electrically connected to the output of pulse stacker 97. The output of pulse stacker 97 is substantially a sawtooth wave form as illustrated in FIG. 3, curve D. The color filter 100 may have any color arrangement desired or may be a prism or the like or it may be a light density wedge, etc. For simplification the filter illustrated has red, green, yellow and blue light transmission sections. It will be recognized that which of these colors is reflected by galvanometer 95 through aperture 116 will depend upon the rotational position of galvanometer 95 which is dependent in turn upon the output from pulse stacker 97 whose output is substantially equal to a sawtooth signal with the distance between peaks and the magnitude of the peaks being functions of the distance between zero crossings. Area light source 94 is electrically connected to output of amplifier 92 and is of a character to flash only when receiving a pulse from pulse switch 93 which occurs at each zero crossing.

Means for obtaining time lines on the film will now be described. Also driven by lead screw 36 is slotted time line generator disc 108 which is interposed between light source 109 and photocell 110. The output pulses from photocell 110 are fed through a counter 111 which passes for example every 20th pulse or whatever pulse is desired to set up the proper time line. The output from the pulse counter is amplified in amplifier 112. To obtain a time line on the recording medium, color wedge 100 is removed and lens 101 may be replaced by a cylindrical lens which will pass a short line of light onto the recording medium. By this arrangement a time line is placed upon film 70. When the time lines are placed upon the film 70, the pulse stacker is inoperative to actuate solenoid 91 or light source 94. This may be accomplished by opening the switches 98 and 99 and closing switch 113 in the line electrically connecting amplifier 112 and light source 94.

The manner of operating the apparatus shown will be reasonably apparent upon examination of the drawing taken in conjunction with the principles and apparatus explained previously in this description. However to further clarify this operation, it may be assumed that a color sensitive film is used as the recording medium 70 and that a conventional oscillographic type seismogram 19 is mounted upon record holder 11 Then assuming a. given static correction for trace 20, the longitudinal position of film 70 is adjusted relative to a reference time line so as to incorporate the desired static correction within the trace reproduced on the film. This adjustment is achieved by turning the hand crank attached to the lead screw 16 which moves platform 81.

Similarly, a spread correction is incorporated within the reproduced trace by adjusting the lateral position of anchor member 23 along its lead screw. This causes longitudinal movement of the record holder 11 and seismogram 19 against the spring 25. When stylus 12 moves from the shallow end of each trace to the deep end of the trace, arm 48 causes progressively less tension to be generated in elongated member 22. This decrease in tension, in turn, causes record holder 11 to move relative to the stylus 12 in a manner which automatically corrects the transposed information of each depth with a spread between the shot point and the geophone which generated the trance in question. It will be recognized that the length of member 22 must bear a relationship to the displacement of anchor member 23 along scale 24 which is proportional to the relationship between the actual depth equivalent to the length of trace 20 and the actual geophone spread of the field. It will further be recognized that the spread correction should be made with the shot point of the various geophone locations being first directed to a common datum elevation. These corrections and other static corrections are well understood by persons skilled in the art and may be incorporated within the section produced on the record medium 70 by shifting the longitudinal position of section holder 13 from trace to trace as desired.

The position of the index members 68 are aligned up with their corresponding time lines on seismogram 19, and clamps 67 of the pulley assemblies 62 are then fixed. The proper gear ratio is also selected for the speed changer 37 so as to coordinate or synchronize movements of the stylus 12 of the printing mechanism 14. The width of the light beam (i.e., the dimension of the beam transverse to the length of the trace to be recorded) is adjusted as necessary by movement of lead screw 86 to correspond to the physical width to be represented by the trace in the section produced. Before printing out a seismic trace in cycle breadth or frequency presentation form, switch 113 is open and switches 98 and 99 are closed.

Having made the adjustments above and having positioned the stylus 12 and the printing mechanism 14 in corresponding positions along seismogram 19 and the recording medium 70, that is at the respective zero time lines, operation of the apparatus may be started. Thus, foot operated pedal 103 is depressed, causing motor 35 and lead screw 36 to turn. This movement causes stylus 12 and printing mechanism 14 to move along their respective traces. Simultaneously the operator turns the knob 45 of selsyn 44 causing selsyn motor 43 to move stylus 12 in a manner to follow lateral variations in trace 20. Light from light source 55 is aligned with the zero axis of the trace being processed so as to aid the operator in keeping on the proper trace. Each time that stylus 12 crosses the zero axis of the trace pulse switch 93 is closed and a short pulse is transmitted to pulse stacker 97 and to amplifier 92. As motor 35 rotates a series of pulses are emitted from photocell 105. These pulses are "stacked" in pulse stacker 97. Each such pulse from photocell 105 received by pulse stacker 97 are added linearly to produce a substantially stairstep sawtooth wave form. This may be better understood by reference to FIG. 3 which shows seismic traces curve A, zero crossing pulses as curve B, the scan distance pulse as C which are from photocell 105 and the stacked scanned distance pulses illustrated in curve B. The output signal from pulse stacker 97, represented by curve D, is fed to galvanometer 95 of the printing device. The galvanometer thus follows curve D, in rotational response. Upon receiving a pulse from pulse switch 93, pulse stacker 97 is discharged and reset to zero.

In operation, between zero crossings permeable shutter 89 is stationary and the printing unit 14 is moved forward by the rotation of shaft 36 as the scanning and printing means move longitudinally along their respective traces and film, a forward end of the printing housing 90 moves away from shutter 89 and at the same time galvanometer 95 is rotated in response to that distance. When pulse switch 93 is actuated by stylus 12 crossing the zero line, a zero crossing pulse triggers light 94 causing it to flash, discharges pulse stacker 97 and energizes solenoid 91. When solenoid 91 is energized it pulls shutter 89 up to the forward wall of printing housing 90 and is then immediately released. Although all of these operations are simultaneously initiated by the reset pulse, the light flashes before the galvanometer and shutter are repositioned because of mechanical lag in these devices. Shutter 89 then stays momentarily stationary while printing mechanism 14 advances forward with the rotation of shaft 36. This process is repeated for each successive zero crossing. Light 94 is off between zero crossings. The color exposed upon receiving each pulse is dependent upon the rotational position of mirror galvanometer 95 at the end of each sawtooth, which is dependent upon the distance between zero crossings. The distance that the front portion of housing 90 moves from shutter 89 is also a function of the distance between zero crossings. The area exposed is then also a function of the distance between the zero crossing. The inertia of shutter 89 permits the film to be exposed before the shutter moves forward to the forward end of housing 90. A typical printout cycle breadth presented trace is illustrated in curve E of FIG. 3. It is shown there that for one distance between zero crossings a red color is exposed; for a second, yellow; for a third, green; for a fourth, blue. It will be recognized that any color combination which is desired may be obtained for presenting this frequency information. It will also be understood that there may be certain blending of colors for certain cycle breadths; however, this is not at all undesirable and in some instances be desirable as it will show trends and frequency variations over a wider area. This process is of course repeated until the trace is transcribed. At the conclusion of the reproduction of a trace in this manner another trace in the seismogram can be reproduced after making the necessary adjustments described above.

It should be noted that in traveling along trace 20, any time-wise distortions of the trace are compensated for by lateral departure of the cam follower 51 along the cam 17. The cam follower, by its transverse motion, causes corresponding longitudinal movements of stylus 12 and thereby continuously position the stylus at a proper position along trace 20.

If desired the sawtooth wave form illustrated in curve D of FIG. 3 could be recorded directly in variable density form by a slight modification of the printing mechanism 14. To accomplish this, area light source 94 is replaced by a constant line source of light. Lens 101, instead of being a type to pass an area of light thereto, is replaced by a type that would pass a sharp line of light transversely to the longitudinal movement of the printing mechanism 14. Galvanometer 95 is directly connected to the output of pulse stacker 97 which has been shown to be illustrated by curve D of FIG. 3. The rotational position of the mirror of galvanometer 95 then determines which color passes through light aperture 116 of shield 96. As the film 70 moves longitudinally with respect to the printing mechanism 14, the film is exposed by that portion of the color of light passing through light aperture 116. Switches 98 and 113 is opened and switch 99 closed. If desired color wedge 100 can be replaced by a variable density wedge, that is, one end passes no light; the other end passes all the light and with varying degrees of light passage there between. This produces the so-called variable intensity section.

If it is desired to have full cycle breadth presentation this can be accomplished by use of a counter 114 in the line from pulse switch 93 to pulse stacker 97. The counter passes only every other pulse from pulse switch 93. A switch 115 is conveniently used to bypass counter 114 when half-cycle breadth presentation is preferred.

It will be understood that various other modifications may be made in the system described herein without departing from the spirit or scope thereof. Therefore the illustrations disclosed herein should be taken as descriptive and not in any way as limiting the disclosure.

What is claimed:

1. An apparatus for preparing a seismic section of the half-cycle breadth presentation type from a seismogram comprising a plurality of oscillographic type traces arranged in a side-by-side relationship with a common arrival time basis which comprises in combination: means for mounting said seismogram, means for mounting a photosensitive film, stylus means for sequentially scanning along each oscillographic trace, means to generate an electrical pulse in response to the lateral movement of said stylus in crossing the center line of said oscillations, light projection means variable in intensity in response to the time between said pulses, said light projection means being actuated by said pulses so as to give off a flash of light at each pulse, means to vary the area of said film exposed by said light projecting means in response to the time between said crossings, means to move said light projection means along said film at a predetermined rate and in synchronism with the aforesaid longitudinal movement of said stylus, analog spread correction means to move said seismogram longitudinally relative to said stylus means so as to correct each said trace for spread error, and means to position each trace of said half-cycle breadth section longitudinally relative to every other trace thereon to correct for static seismic error.

2. An apparatus as defined in claim 1 in which the recording means comprises a fixed intensity light source and a variable density light filter interposed between the light source and the film.

3. An apparatus as defined in claim 1 in which recording means comprises a fixed intensity light source and a variable color light filter interposed between the light source and the film.

4. An apparatus for preparing a half-cycle breadth seismic section from a seismogram comprising a plurality of oscillographic type traces having zero crossings and arranged side-by-side in common arrival time relation which comprises: a flat surface member adapted to support such seismogram, stylus means, a photosensitive film, a second flat surface member adapted to support the photosensitive film, means to move such stylus sequentially along the length of each oscillographic trace at a predetermined rate, said stylus means being laterally movable relative to the center line of each oscillographic trace and to detect the crossing of the center line by lateral movements of said stylus means, recording means of a character to direct a beam of light against the film in response to the crossing of said center line by said stylus means, means to vary the intensity of the light in accordance with the distance between said zero crossings, means to move said recording means along the photosensitive film at a predetermined rate in synchronism with longitudinal movement of said stylus means, means for varying the area of film exposed in response to each zero crossing according to the distance between two successive crossings, means to move said second supporting surface longitudinally to incorporate a static seismic correction within each half-cycle breadth trace, means to move said second flat surface laterally to record said half-cycle breadth trace in a side-by-side relationship, and analog spread correction means operable to the movement of said stylus along the oscillographic trace to move said first flat surface longtiudinally relative to said stylus to incorporate a static correction within the corresponding cycle breadth trace.

5. An apparatus as defined in claim 4 including speed transmission means to superimpose a variable rate upon said predetermined rate of longitudinal movement of said stylus.

6. An apparatus as defined in claim 4 in which the recording means comprises a fixed intensity light source and a variable density light filter interposed between the light source and the film.

7. An apparatus as defined in claim 4 in which the recording means comprises a fixed intensity light source and a variable color light filter interposed between the light source and the film.

8. An apparatus for comparing a half-cycle breadth seismic section from a seismogram comprised of a plurality of oscillographic type traces having zero crossings which comprises in combination: a first flat surface for mounting the seismogram and having a longitudinal dimension parallel to the time axis of the oscillographic traces, a stylus, means to move said stylus separately and sequentially along each oscillographic trace at a predetermined rate, manually operable means to move said stylus laterally from the longitudinal axis of each trace so as to follow amplitude variation in the trace, means to detect crossings of the longitudinal axis of each trace by said stylus, a recording medium, a second flat surface adapted to support said medium and having a longitudinal dimension corresponding to the longitudinal dimension of the medium, recording means movable at a predetermined rate along the recording medium and cooperable therewith to form a half-cycle breadth trace having its density representative of the distance between said crossings, said recording means being movable simultaneously with movement of said stylus so as to form a separate half-cycle breadth trace for each oscillographic trace, means to effect lateral movement between said recording means and said medium to record the cycle breadth traces in a side-by-side relation, means responsive to said manually operable means to generate an electric pulse for each crossing, means to generate a substantially sawtooth shaped wave form having the height of each peak a function of the distance between successive zero crossings, said recording means being responsive to said sawtooth wave form to vary the intensity of the half-cycle breadth trace, means for longitudinally positioning the second flat surface for each half-cycle breadth trace for static error.

9. An apparatus as defined in claim 8 including analog spread correction means adapted to move said seismogram longitudinally relative to said stylus simultaneously with movement of the stylus along an oscillographic trace to enter spread corrections within the corresponding cycle breadth trace.

10. An apparatus as defined in claim 8 in which the recording medium is of photosensitive film and the recording means includes a light source and a variable color filter means between the light source and the film.

11. An apparatus as defined in claim 10 including transmission means to superimpose a variable rate of longitudinal movement upon said predetermined rate of longitudinal movement for said stylus.

12. A method for translating oscillographic seismic trace records to a cycle breadth trace record which comprises scanning along an oscillographic trace to detect zero crossings of said trace, simultaneously recording variations in the breadth between said crossings in the oscillographic trace as intensity variations in a second trace, varying the rate of a scan of oscillographic trace relative to the rate of recording of the second trace to incorporate spread correction along the reproducible trace, further varying the rate of scan of the oscillographic trace relative to the recording of said second trace to keep said traces in seismic time synchronism.

13. A method as defined in claim 12 in which recording of the second trace is at a constant rate.

14. A method as defined in claim 12 in which the second trace is recorded in the form of a variable color trace.

15. A method as defined in claim 12 in which the second trace is recorded in the form of a variable density photographic trace.

16. An apparatus for translating an oscillographic seismic trace having zero crossing about a reference base line into a phonographically reproducible half-cycle breadth trace which comprises a flat surface adapted to support the seismic trace and having a longitudinal dimension parallel to the time axis of the trace, a stylus means movable at a predetermined rate along the seismic trace and movable laterally from the time axis of the trace to follow oscillations of the trace, said stylus means including means to detect said zero crossings, a recording medium and recording means of a charatcer to record a phonographically reproducible trace, said recording means being movable along the recording medium at a predetermined rate and simultaneously with longitudinal movement of said stylus along said seismic trace, means to vary the intensity of the reproducible trace proportionally to distances between zero crossings detected by the lateral movement of said stylus means, means to impose a variable rate of longitudinal movement on said stylus in addition to said predetermined rate of longitudinal movement of the stylus, an analog spread correction means to move said flat surface longitudinally and simultaneously with longitudinal movement of said stylus.

17. An apparatus for preparing a frequency presented seismic section from a seismogram comprising a plurality of oscillographic type traces having zero crossings and arranged side-by-side in common arrival time relation which comprises: a flat surface member adapted to support such seismogram, stylus means, a photosensitive film, a second flat surface member adapted to support the photosensitive film, means to move such stylus sequentially along the length of each oscillographic trace at a predetermined rate, said stylus means being laterally movable relative to the center line of each oscillographic trace and to detect the crossing of the center line by lateral movements of said stylus means, recording means of a character to direct a beam of light against the film in response to the crossing of said center line by said stylus means, means to vary the intensity of the light in accordance with the distances between said zero crossings, means to move said recording means along the photosensitive film at a predetermined rate in synchronism with longitudinal movement of said stylus means, means for varying the area of film exposed in response to each zero crossing according to the distance between two successive crossings.

18. An apparatus for transcribing a seismogram formed by a plurality of oscillographic type traces having zero crossings and arranged side-by-side in a common arrival time relation which comprises: a flat surface member adapted to support such seismogram, stylus means being laterally movable relative to the center line of each oscillographic trace and of a character to detect the crossing of the center line by a lateral movement of said stylus means, means to move said stylus means sequentially along the length of each oscillographic trace, and means to generate a substantially sawtooth waveform with a constant linearly rising voltage ramp which is reset to zero at the detection of a zero crossing.

19. A recorder for recording a signal upon a photosensitive film which comprises in combination: a holder for said film; a housing being open at the bottom side; a housing guide means on said holder for said housing; means to move said housing along said guide means; a bottom slide plate of a character capable of sliding along said guide means and effectively closing the lower side of said housing; light means in said housing responsive to said signal; and means to move said bottom slide plate in a step-wise relationship in response to said signal.

20. A recording means for recording a substantially sawtooth waveform on a film which comprises in combination: a holder for said film; a housing having an opening in its lower side; a movable shutter of a character to vary the size of the opening of said housing; a guide to support said housing from said film; means to move said housing along said guide at a speed proportional to the time dimension of said sawtooth signal; light means in said housing of a character to flash at each peak of said sawtooth signal; a rotatable mirror whose rotation is responsive to said sawtooth signal and arranged to receive light from said light source and reflect such light through said opening to said film; a variable intensity light wedge positioned between said light and said mirror; and means to move said shutter only at each peak of said sawtooth signal, such movement being sufficient to close the opening in said housing.

21. An apparatus as defined in claim 20 in which said light wedge is of the variable color type.

22. A recording means for recording a substantially sawtooth waveform on a photosensitive medium which comprises in combination: a holder for said photosensitive medium; a housing having a variable opening in its lower side; a guide to support said housing in such a manner that the opening of said housing is adjacent said photosensitive medium; means to move said housing along said guide; light means in said housing and of a character to flash each peak of the sawtooth waveform; means to vary the characteristic of the light passing through said opening in accordance with the amplitude of the peak; and means to vary the size of the opening proportional to the amplitude of the peak which causes the flashing of the light.

23. An apparatus as defined in claim 22 in which the means to vary the characteristics of the light is a means to vary the color of the light passing through said opening in accordance with the amplitude of the peak of the sawtooth waveform causing the flashing of the light.

References Cited in the file of this patent

UNITED STATES PATENTS

| | | |
|---|---|---|
| 2,604,955 | Hawkins | July 29, 1952 |
| 2,840,441 | Owen | June 24, 1958 |
| 2,924,810 | Horeth | Feb. 9, 1960 |
| 2,965,432 | Alfaya et al. | Dec. 20, 1960 |
| 2,998,593 | Crook | Aug. 29, 1961 |
| 3,072,906 | Williams | Jan. 8, 1963 |
| 3,072,907 | Boucher | Jan. 8, 1963 |